(12) United States Patent
Lee et al.

(10) Patent No.: US 9,838,603 B2
(45) Date of Patent: Dec. 5, 2017

(54) METHOD AND APPARATUS FOR IMAGE STABILIZATION

(71) Applicant: Samsung Electronics Co., Ltd., Gyeonggi-do (KR)

(72) Inventors: Yonggu Lee, Seoul (KR); Homin Lee, Gyeonggi-do (KR); Moonsoo Kim, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/041,265

(22) Filed: Feb. 11, 2016

(65) Prior Publication Data

US 2016/0234440 A1    Aug. 11, 2016

(30) Foreign Application Priority Data

Feb. 11, 2015 (KR) .......... 10-2015-0020998

(51) Int. Cl.
*H04N 5/225* (2006.01)
*H04N 5/232* (2006.01)

(52) U.S. Cl.
CPC ..... *H04N 5/23258* (2013.01); *H04N 5/23254* (2013.01); *H04N 5/23264* (2013.01)

(58) Field of Classification Search
CPC ........... H04N 5/23258; H04N 5/23264; H04N 5/23254
USPC ................ 348/220.1, 208.1–208.4
See application file for complete search history.

(56) References Cited

U.S. PATENT DOCUMENTS 8,988,536 B2    3/2015 Park et al.
2009/0128638 A1* 5/2009 Okada ............... H04N 5/23248
348/208.2

FOREIGN PATENT DOCUMENTS

KR    10-2010-0063496 A    6/2010
KR    10-2012-0072348 A    7/2012

* cited by examiner

*Primary Examiner* — Yogesh Aggarwal
(74) *Attorney, Agent, or Firm* — Cha & Reiter, LLC

(57) ABSTRACT

According to aspects of the disclosure, a method is provided for use in an electronic device, comprising: capturing one or more image frames by using at least one image sensor of the electronic device; displaying, on a display, a first image that is generated by performing a first-type Digital Image Stabilization (DIS1) based on at least some of the image frames; and storing, in a memory, a second image generated by performing a second-type Digital Image Stabilization (DIS2) based on at least some of the image frames.

18 Claims, 9 Drawing Sheets

METHOD AND APPARATUS FOR IMAGE STABILIZATION

CLAIM OF PRIORITY

This application claims priority under 35 U.S.C. §119(a) of a Korean Application Serial No. 10-2015-0020998, which was filed in the Korean Intellectual Property Office on Feb. 11, 2015, the entire content of which is hereby incorporated by reference.

TECHNICAL FIELD

The present disclosure is related to electronic devices, in general, and more particularly to a method and apparatus for image stabilization.

BACKGROUND

In general, Image Stabilization (IS) may be variously referred to as camera-shake compensation, hand-shake compensation, or the like, and is used to avoid vibration of an image of a subject to be captured when a hand shake, camera shake, or the like occurs against an intention of a person taking a photo in a state where a camera is in motion or still.

The IS may be applied to various types of electronic devices such as a digital camera, a smartphone, or the like, and may be classified as Optical Image Stabilization (OIS), Digital Image Stabilization (DIS), or the like.

The OIS can stabilize the image of the subject to be captured by canceling out, for example, a camera-lens shake through mechanical compensation. The DIS can stabilize the image of the subject to be captured by performing a crop operation in which a shake component is detected on the basis of the image of the subject to be captured and a part of an outline of the image of the subject to be captured is selectively removed in association with the shake component.

SUMMARY

According to aspects of the disclosure, a method is provided for use in an electronic device, comprising: capturing one or more image frames by using at least one image sensor of the electronic device; displaying, on a display, a first image that is generated by performing a first-type Digital Image Stabilization (DIS1) based on at least some of the image frames; and storing, in a memory, a second image generated by performing a second-type Digital Image Stabilization (DIS2) based on at least some of the image frames.

According to aspects of the disclosure, an electronic device is provided comprising: an image sensor; a memory; and at least one processor operatively coupled to the memory, configured to: capture one or more image frames by using the image sensor; display a first image that is generated by performing a first-type Digital Image Stabilization (DIS1) based on at least some of the image frames; and store, in the memory, a second image generated by performing a second-type Digital Image Stabilization (DIS2) based on at least some of the image frames.

According to aspects of the disclosure, a non-transitory computer-readable medium is provided storing one or more processor-executable instructions which when executed by at least one processor cause the at least one processor to perform a method comprising the steps of: capturing one or more image frames by using at least one image sensor; displaying, on a display, a first image that is generated by applying a first-type Digital Image Stabilization (DIS1) to at least some of the image frames; and storing, in a memory, a second image generated by applying a second-type Digital Image Stabilization (DIS2) to at least some of the image frames.

BRIEF DESCRIPTION OF THE DRAWINGS

The above and other aspects, features and advantages of certain exemplary embodiments of the present disclosure will be more apparent from the following detailed description taken in conjunction with the accompanying drawings, in which.

DETAILED DESCRIPTION

Hereinafter, various embodiments of the present disclosure are described with reference to the accompanying drawings. The various embodiments of the present disclosure may be modified in various forms. An electronic device according to various embodiments of the present disclosure may be not only a digital camera but also various types of electronic devices such as a smartphone, a tablet Personal Computer (PC), and the like having an image capturing element such as a camera module.

As one module capable of capturing a still image and a moving image, according to one embodiment, the camera module may include one or more image sensors (e.g., a front sensor or a rear sensor), a lens, an Image Signal Processor (ISP), or a flash (e.g., a Light Emitting Diode (LED) or a xenon lamp). This is not limited to a specific embodiment described hereinafter, as will be apparent to those ordinarily skilled in the art.

Figure 1:
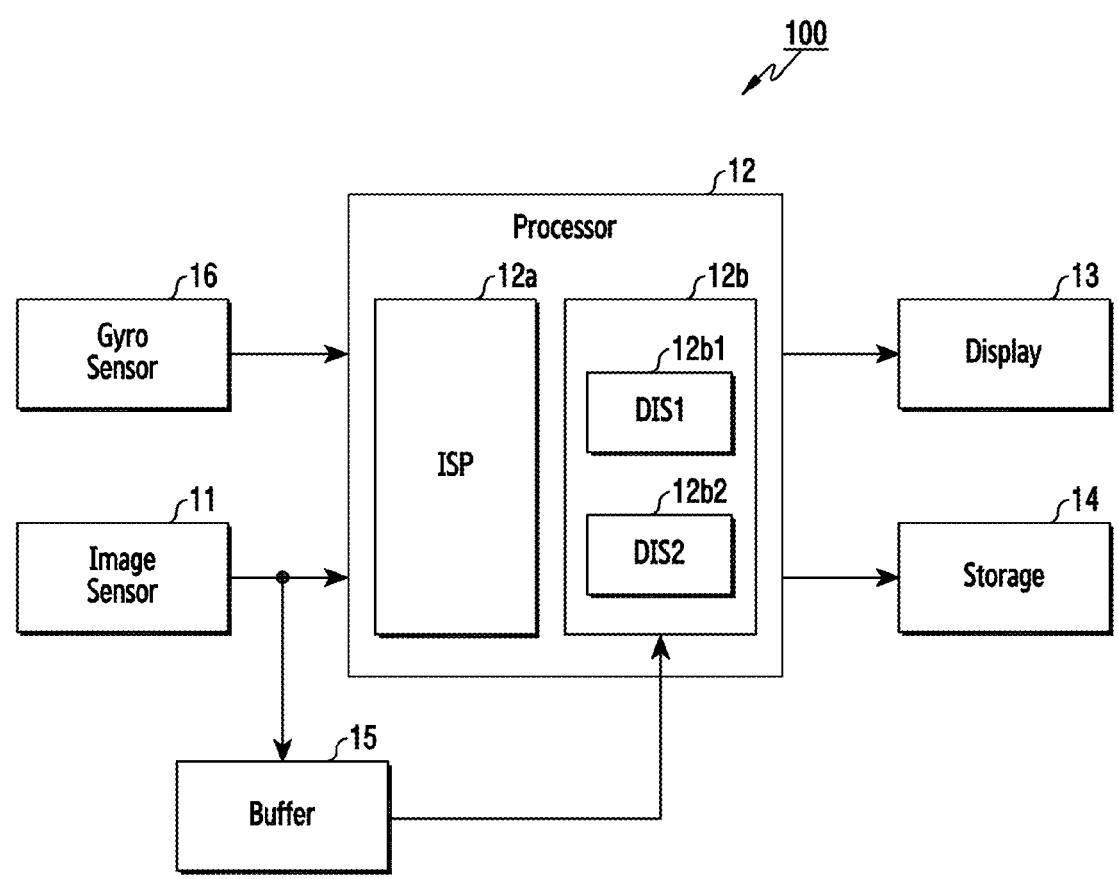
FIG. 1 is a block diagram of an example of an electronic device, according to various embodiments of the present disclosure.

FIG. 1 is a block diagram of an example of an electronic device, according to various embodiments of the present disclosure. For example, an electronic device 100 may be a digital camera or various types of electronic devices such as a smartphone or the like.

Referring to FIG. 1, the electronic device 100 may include an image sensor 11, a processor 12, a display 13, a storage 14, a buffer 15, a gyro sensor 16, or the like.

The image sensor 11 may use various types of image sensors such as a Charge Coupled Device (CCD), a CMOS Image Sensor (CIS), or the like, and may continuously capture images on a real-time basis. The image sensor 11 may continuously capture and output, for example, high-resolution images. The high-resolution images may be temporarily stored in the buffer 15 in consecutive order. The buffer 15 may include, for example, a ring buffer or the like.

The high-resolution images temporarily stored in the ring buffer may be displayed as preview images by being downscaled, for example, as relatively low-resolution images. On the other hand, the high-resolution images temporarily stored in the ring buffer may be stored in the storage 14.

That is, a preview image to be displayed on a preview screen through the display and a permanent image to be stored in the storage may be images of the same scene, whereas a resolution (e.g., a High Definition (HD) level) of the preview image may differ from a resolution (e.g., a Full HD (FHD) level) of the permanent image.

The processor 12 may include any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), etc. In some implementations, the processor 12 may include an Image Signal Processor (ISP) block 12a and a Digital Image Stabilization (DIS) block 12b. The DIS block 12b may include a first-type DIS (or DIS1) block 12b1 and a second-type DIS (or DIS2) block 12b2. According to one embodiment, the processor 12 may include an Optical Image Stabilization (OIS) block (not shown). The processor 12 may be variously referred to as an application processor or the like. The processor 12 may process an image of a subject, and may perform a DIS operation on the basis of at least two images temporarily stored in the buffer 15.

The display 13 may display a shake-compensated image on the preview screen through a DIS1 operation of the processor 12. The storage 14 may store the shake-compensated image through a DIS2 operation of the processor 12. The storage 14 may include any suitable type of volatile or non-volatile memory, such as Random-access Memory (RAM), Read-Only Memory (ROM), Network Accessible Storage (NAS), cloud storage, a Solid State Drive (SSD), etc.

For example, the processor 12 may use the DIS1 to generate the preview image to be displayed on the display 13, awhile using DIS2 to generate the permanent image to be stored in the storage 14. According to one embodiment, the DIS1 may be associated with a first time delay, and the DIS2 may be associated with a second time delay. The first time delay may be greater than or equal to 0 (zero), and may be shorter than the second time delay.

According to one embodiment, the DIS1 corrects the shake on the basis of previous and current K image frames, and the DIS2 corrects the shake on the basis of previous, current, and next K or more image frames, where K may be a natural number greater than or equal to 2.

According to one embodiment, the K or more image frames are continuously captured by the image sensor 11 and thereafter are temporarily stored in the buffer 15 in consecutive order. For example, if the buffer 15 has a capacity to store one image frame, K or more buffers may be required to perform the DIS.

According to one embodiment, upon detection of motion data corresponding to the shake of the electronic device 100 by the gyro sensor 16, the processor 12 may apply the motion data to the image shake compensation. In this case, the motion data may be ignored when the motion data is less than or equal to a pre-set threshold so that an unreliable detection result is not used in the image shake compensation operation. In other words, in some embodiments, at least one of DIS1 and DIS2 may be performed only when a measure of camera shake that is received from the gyro sensor 16 exceeds a threshold.

Figure 2:
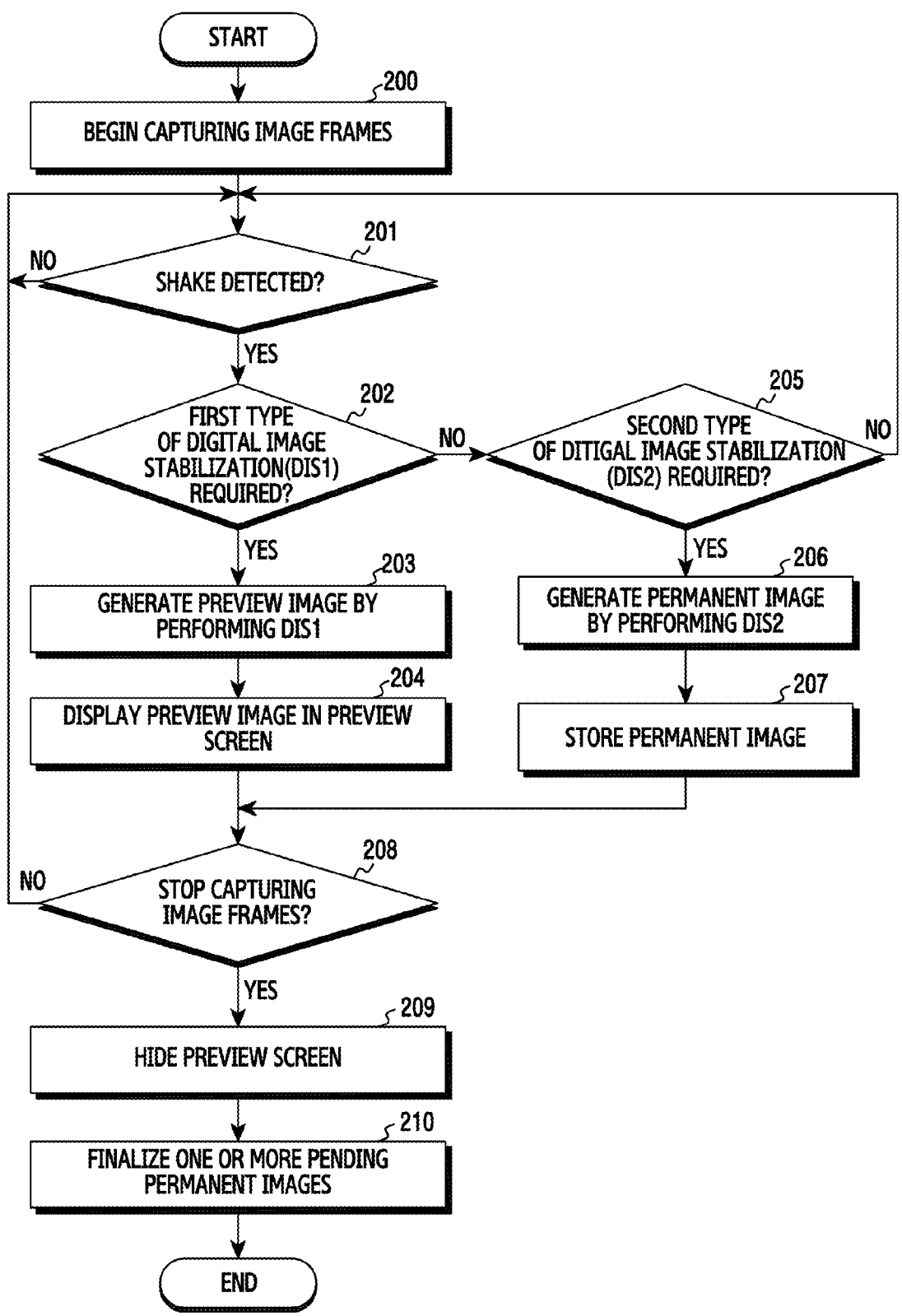
FIG. 2 is a flowchart of an example of a process, according to various embodiments of the present disclosure.

FIG. 2 is a flowchart of an example of a process, according to various embodiments of the present disclosure. Referring to FIG. 2, in operation 200, the processor 12 of the electronic device 100 may begin capturing image frames. The image frames may be captured while the electronic device is in still image capturing mode or video capturing mode.

In operation 201, while the image frames are being captured, the processor 12 may detect a camera shake. For example, the camera shake (e.g., a shake of a user's hand, a shake of a device, or the like) may be detected on the basis of one or more of motion vectors detected by comparing motion data detected by the gyro sensor 16 and/or one or more of the image frames.

In operation 202, the processor 12 may detect whether performing the DIS1 is required. In operation 203, in response to detecting that performing the DIS1 is required, the processor may generate a preview image by performing the DIS1 based on one or more image frames that are captured by the image sensor.

In operation 204, the processor 12 may display the preview image in a preview screen that is presented on the display 13.

In operation 205, the processor 12 may detect whether performing the DIS2 is required.

In operation 206, the processor 12 may generate a permanent image by performing the DIS2 based on one or more image frames that are captured by the sensor. The permanent image may depict the same scene as the preview image.

In operation 207, the processor 12 may store the permanent image in the storage 14.

In operation 208, the processor 12 may detect whether a predetermined condition is satisfied for stopping the capturing of the image frames. For example, the processor 12 may detect whether a user input is received by the electronic device that requests the capturing of the frames to stop.

In operation 209, the processor 12 may stop the displaying of the preview screen on the display 13, in response to detecting that the condition is satisfied.

In operation 210, the processor 12 may finalize any pending permanent images. More particularly, in some implementations, one or more permanent images may be scheduled to be generated and/or stored when the condition for stopping the capturing of image frames is satisfied. In such instances, the processor 12 may continue to generate and/or store one or more of the scheduled permanent images after the display of preview images has stopped until all permanent images are stored that correspond to preview images displayed prior to the condition being satisfied. In other words, the processor 12 may stop the generating and/or storing of permanent images after a permanent image is stored that corresponds to the same scene as the last preview image displayed on the preview screen at a time at which the stopping of the capturing is requested.

After storing up to the scheduled permanent images, the processor 12 may perform an operation of stopping the storing as a background operation which is not recognizable by a user.

Figure 3:
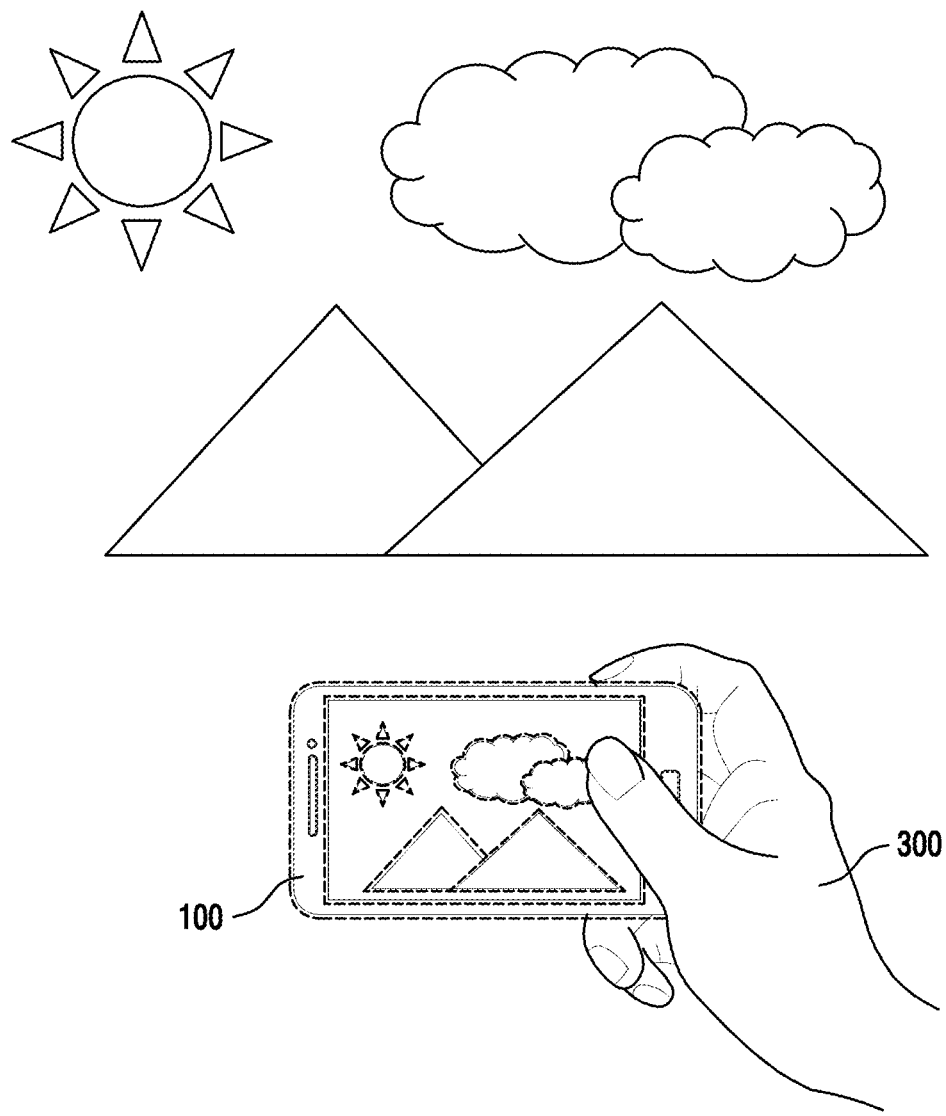
FIG. 3 is a diagram illustrating an example of a situation in which camera shake occurs, according to various embodiments of the present disclosure.
Figure 4:
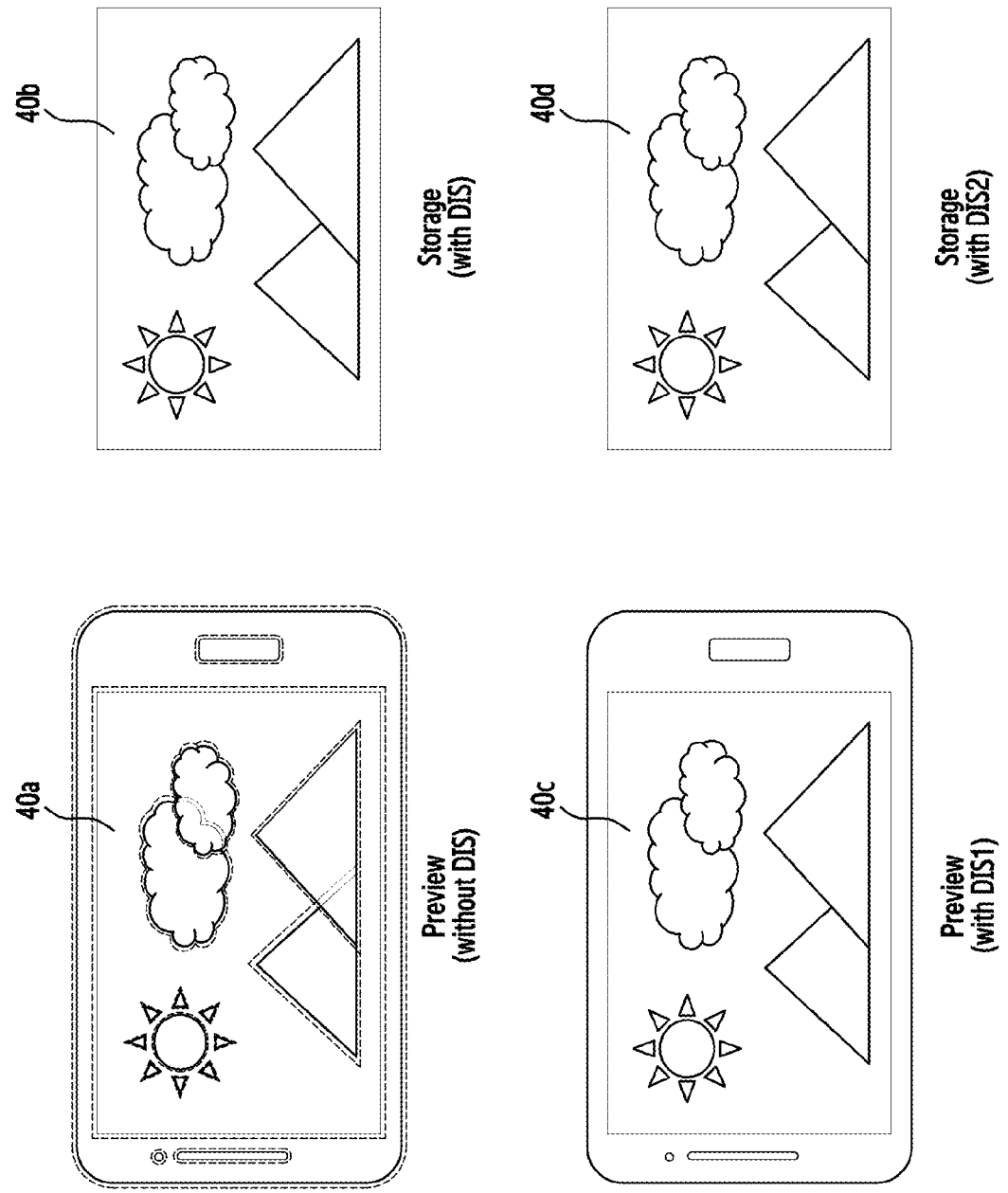
FIG. 4 is a diagram illustrating the effects of camera shake and image stabilization on images, according to various embodiments of the present disclosure.

FIG. 3 is a diagram illustrating an example of a situation in which camera shake occurs, according to various embodiments of the present disclosure, and FIG. 4 is a diagram illustrating the effects of camera shake and image stabilization on images, according to embodiments of the present disclosure.

Referring to FIG. 3, an electronic device 100 may be, for example, a smartphone, a digital camera, or the like, and a user 300 may capture video in real-time by using the electronic device 100.

The electronic device 100 may experience a hand-shake phenomenon due to an unstable posture of the user 300 during the capturing. An image of a subject to be captured may shake unstably due to the hand shake.

Referring to FIG. 4, if the hand-shake phenomenon occurs, the electronic device 100 may not use DIS when generating a preview image 40a to be displayed on a preview screen of the display 13 but may only use DIS when generating a permanent image 40b to be stored in the storage 14. However, in this case, any shake that is visible in the preview image may cause the user 300 to feel uncomfortable during the capturing.

In various embodiments of the present disclosure, DIS1 for compensating the shake on the basis of K image frames may be used to generate a preview image 40c to be displayed on the preview screen of the display 13, and DIS2 for compensating the shake on the basis of K or more image frames may be used to generate a permanent image 40d to be stored in the storage 14.

Accordingly, regarding the preview image 40c to be displayed on the preview screen, a shake-compensated image with a first level (e.g., weak shake compensation) may be rapidly displayed, and regarding the permanent image 40d to be stored in the storage 14, a shake-compensated image with a second level (e.g., strong shake compensation) may be stored.

Figure 5:
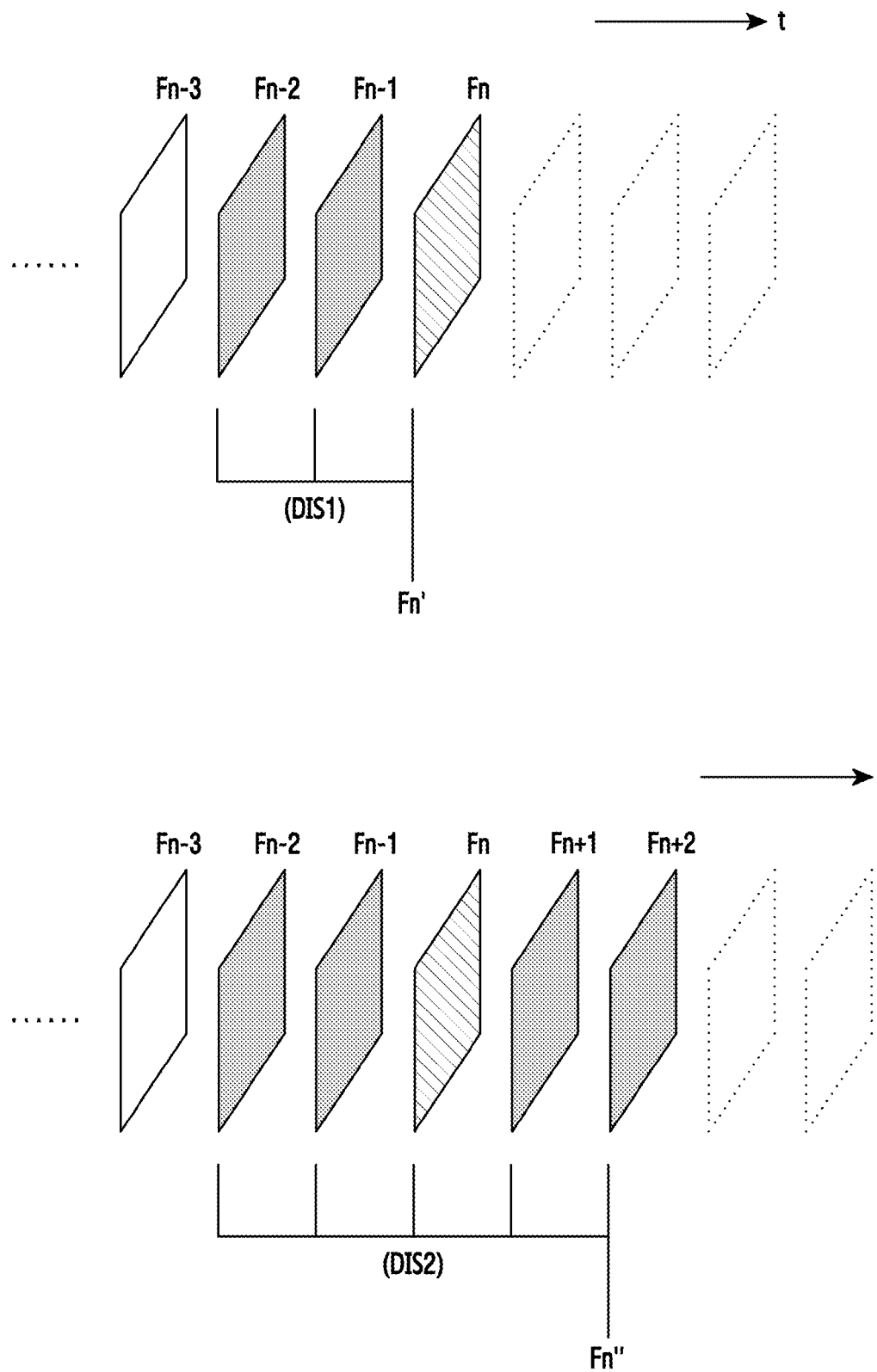
FIG. 5 is a diagram illustrating an example of a process for image stabilization, according to various embodiments of the present disclosure.

FIG. 5 is a diagram illustrating an example of a process for image stabilization, according to various embodiments of the present disclosure. Referring to FIG. 5, the processor 12 may store the permanent image 40d in the storage 14 while displaying the preview image 40c on the preview screen of the display 13. In this case, the displaying and the storing may be performed in parallel with respect to a specific time interval.

According to aspects of the disclosure, the permanent image 40d and the preview image 40c may both depict the same scene, and each of the permanent image 40d and the preview image 40c may be generated at least partially based on the same image frame. For example, the DIS1, which is used to generate the preview image 40c, may provide weak shake compensation and may be performed based previous and current 3 image frames (e.g., image frames N-2, N-1, N), and the DIS2, which is used to generate the permanent image 40d, may provide strong shake compensation based on previous, current, and next 5 image frames (e.g., image frames N-2, N-1, N, N+1, N+2).

Since the weak shake compensation is processed rapidly, a time delay of the weak shake may be 0 (zero) due to real-time shake compensation. By contrast, the strong shake may have a greater time delay than the weak shake compensation, and thus may be variously referred to as delayed shake compensation or the like.

In this case, a time at which the permanent image 40d is stored may be a time delayed by more than a time consumed for signal processing by using at least one image frame after a time at which the preview image 40c is displayed.

For example, referring to FIG. 5, when DIS1 is performed based on the 3 image frames, a shake in an $n^{th}$ frame Fn may be detected and compensated for by using an $(n-1)^{th}$ frame Fn-1 and an $(n-2)^{th}$ frame Fn-2. As a result of performing DIS1, a preview image Fn' can be generated and then displayed on the preview screen almost in real-time.

On the other hand, when DIS2 is performed based on the 5 image frames, a shake for the $n^{th}$ frame Fn may be detected and compensated for by using an $(n-2)^{th}$ frame Fn-2, an $(n-1)^{th}$ frame Fn-1, an $(n+1)^{th}$ frame Fn+1, and an $(n+2)^{th}$ frame Fn+2. As a result of performing DIS2, a permanent image Fn" may be generated and subsequently stored in memory.

Accordingly, a specific time interval may exist that spans between the time of generating the preview image Fn' that is generated by using the DIS1 and the time of generating the permanent image Fn" that is generated by using the DIS2. Further, a time interval may also be generated between a display time of the image frame Fn' and a storage time of the image frame Fn".

Figure 6:
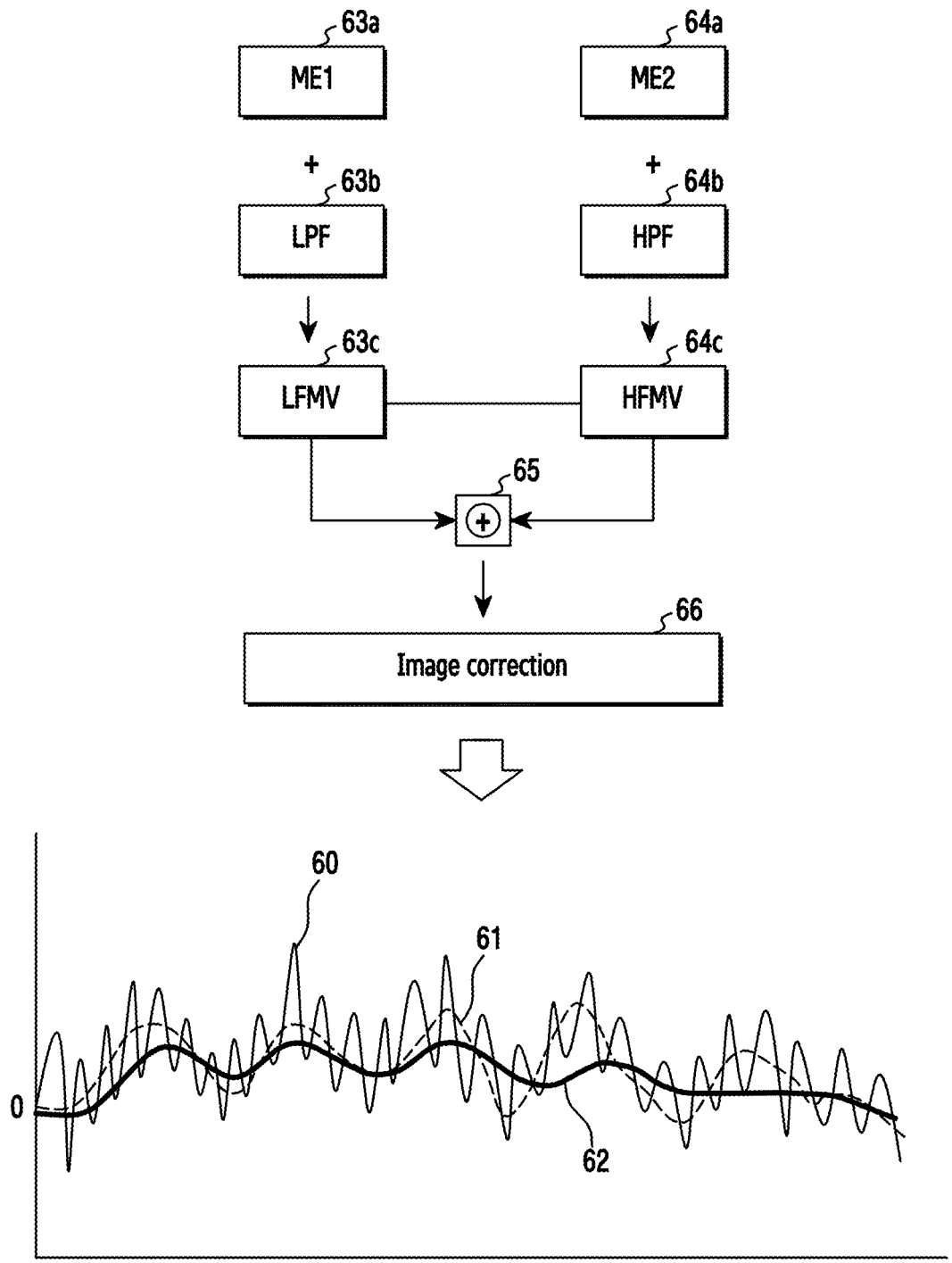
FIG. 6 is a graph illustrating an example of a shake compensation value, according to various embodiments of the present disclosure.

FIG. 6 is a graph illustrating an example of a shake compensation value, according to various embodiments of the present disclosure. For example, if a hand shake occurs during the electronic device 100 slowly moves, a low-frequency pulse based on the slowly moving operation and a high-frequency pulse based on the hand shake may be measured simultaneously.

Referring to FIG. 6, the electronic device 100 may include a first Motion Estimator (ME1) block 63a for estimating a motion through comparison between captured images and a second Motion Estimator (ME2) block 64 for estimating a motion based on a signal received from a gyro sensor.

A signal output from the ME2 block 64a may be a high-frequency signal. A signal output from the ME1 block 63a may be a relatively low-frequency signal.

As shown in FIG. 6, the high-frequency signal may pass through a High Pass Filter (HPF) 64b having a high-frequency cut-off value and then may be input to a High Frequency Motion Vector (HFMV) block 64c. The high-frequency signal may be output from the HFMV block 64c as a pulse signal denoted by a thin solid line 60 in FIG. 6.

On the other hand, the low-frequency signal may pass through a Low Pass Filter (LPF) 63b having a low-frequency cut-off value, and then may be input to a Low Frequency Motion Vector (LFMV) block 63c. The low-frequency signal may be output from the LFMV block 63c as a pulse signal denoted by a dotted line 61 in FIG. 6.

In addition, the pulse signals may be combined by a merge block 65 so as to be output as a signal denoted by a thick solid line 62 of FIG. 6. The signal indicated by the thick solid line 62 may be input to an image correction block 66 and thus may be used in shake compensation.

According to aspects of the disclosure, any of the aforementioned blocks may be implemented in hardware, and/or as a combination of hardware and software. Although in the present example the aforementioned blocks are depicted as separate components, in some implementations any number of them may be integrated together into a single unit.

In one embodiment, if a user shoots video while walking, the processor 12 may determine whether the electronic device 100 shakes by using a motion vector between image frames based on a real movement and by using gyro information detected by the gyro sensor 16.

For example, even if the electronic device 100 is in a fixed state without a hand shake, it may be detected as a value having a shake component in the motion vector between the image frames according to an overall movement of a subject to be captured.

On the other hand, since the gyro sensor outputs a stable detection value without a shake component, the overall movement of the subject to be captured can be prevented from being incorrectly determined as a hand shake.

Figure 7:
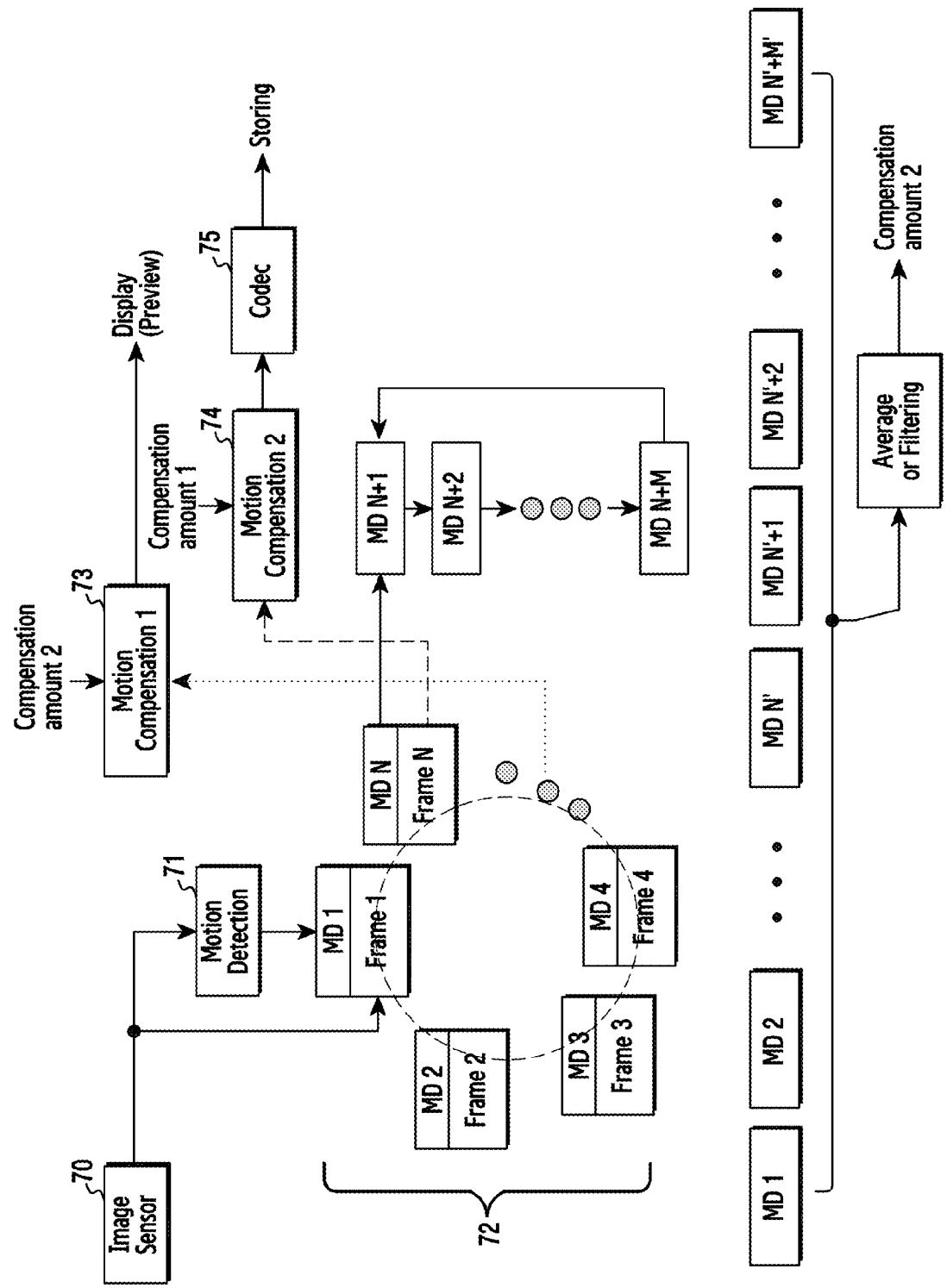
FIG. 7 is a diagram illustrating an example of a process, according to various embodiments of the present disclosure.

FIG. 7 is a diagram illustrating an example of a process for image stabilization, according to various embodiments of the present disclosure. Referring to FIG. 7, the electronic device 100 may temporarily store high-resolution (e.g., FHD level) images captured continuously by an image sensor 70 in consecutive order. For example, the electronic device 100 may temporarily store the images, for example, in K ring buffers 72 in consecutive order, and may temporarily store Motion Data (MD) detected by a motion detection block 71 in the ring buffer together with the images.

The electronic device 100 may read K images (e.g., image frames N−2, N−1, N) from the ring buffer, scale down the read images into relatively low-resolution (e.g., HD level) images, and thereafter display a shake-compensated preview image on a preview screen in real-time via a first motion compensation block 73.

Concurrently with the above operation, the electronic device 100 may read K or more images (e.g., image frames N−2, N−1, N, N+1, N+2) among the high-resolution (e.g., FHD level) images stored in the ring buffer, and may output a sufficiently and correctly shake-compensated permanent image to a codec 75 via a second motion compensation block 74 to store the images in a storage.

The electronic device may detect several different types of motion information such as a linear movement, a rotation movement, a rotation center point, a rolling amount, or the like. The electronic device 100 may detect the shake or the like by using not only the gyro sensor 16 but also any other suitable type of sensor that is part of the electronic device, such as an accelerometer. In each image to be temporarily stored in the ring buffer, a frame number of a corresponding image, motion detection data, or the like may be tagged as metadata.

Figure 8:
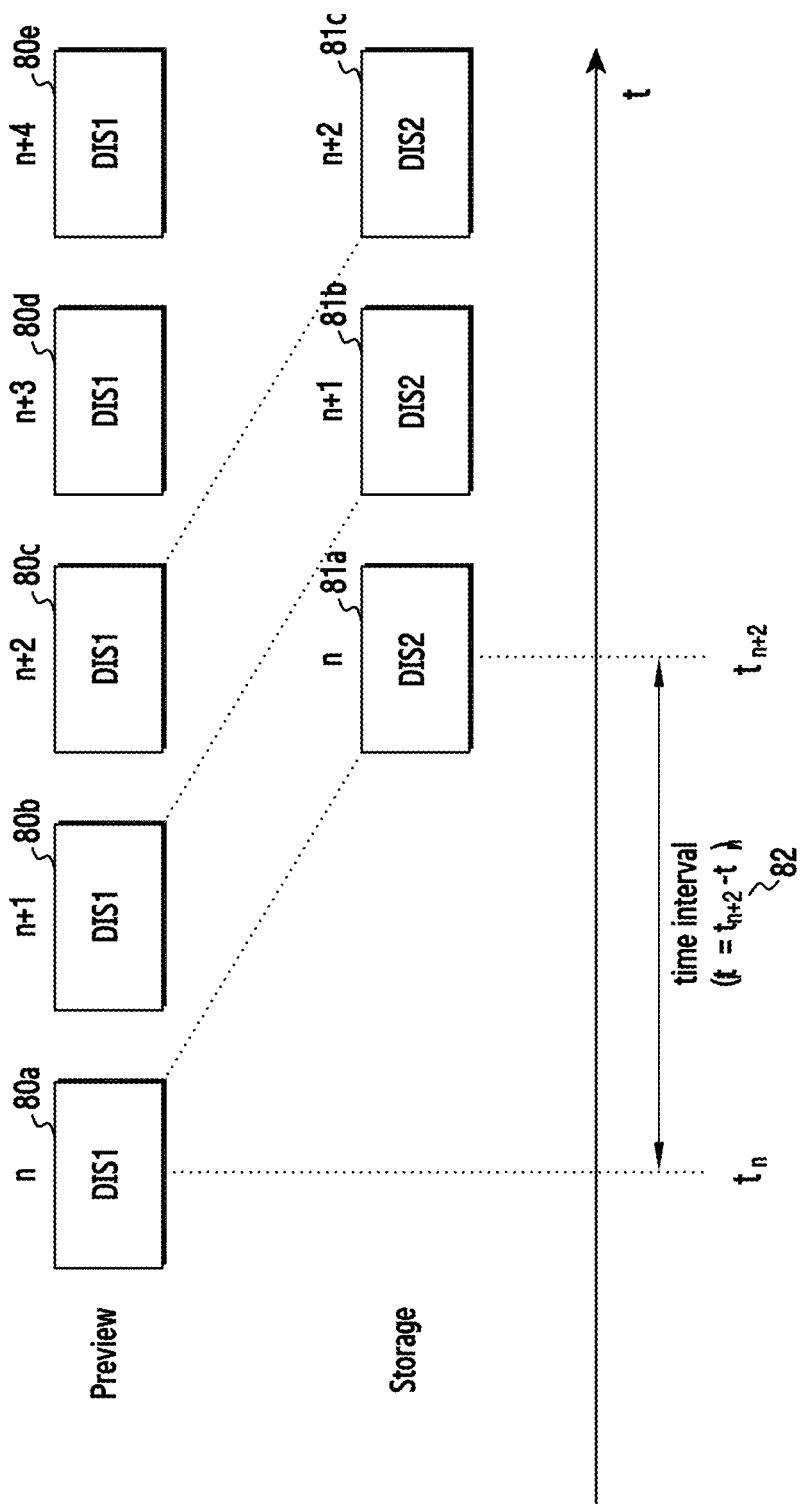
FIG. 8 is a diagram illustrating an example of a process, according to various embodiments of the present disclosure.

FIG. 8 is a diagram illustrating an example of a process, according to various embodiments of the present disclosure. Referring to FIG. 8, the electronic device 100 may use DIS1 based on K image frames (e.g., image frames n−2, n−1, n) to generate a preview image to be displayed on a preview screen of the display 13.

The electronic device 100 may use DIS2 based on K or more image frames (e.g., n−2, n−1, n, n+1, n+2) to generate a permanent image to be stored in the storage 14.

Accordingly, as shown in FIG. 8, a specific time interval 82 may span between the time when the preview images 80a-c are displayed on the preview screen of the display 13 and permanent images 81a c to be stored in the storage 14.

Figure 9:
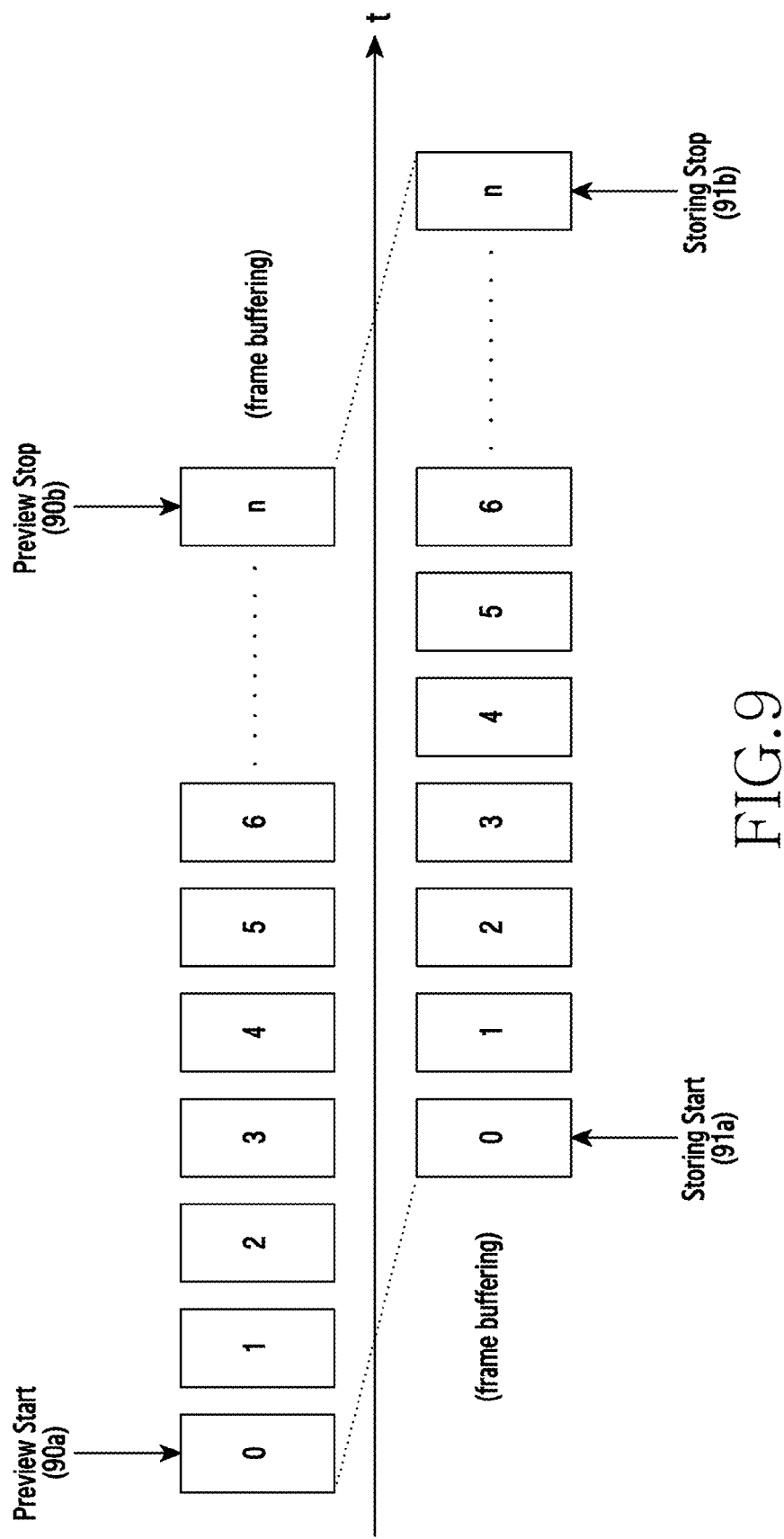
FIG. 9 is a diagram illustrating an example of a time interval in which preview and storage operations are performed, according to various embodiments of the present disclosure.

FIG. 9 is a diagram illustrating an example of a time interval in which preview and storage operations are performed, according to various embodiments of the present disclosure. Referring to FIG. 9, DIS1 based on K image frames (e.g., image frames N−2, N−1, N) is used to generate a preview image to be displayed on a preview screen through the display 13, and DIS2 based on K or more image frames (e.g., image frames N−2, N−1, N, N+1, N+2) is used to generate a permanent image to be stored in the storage 14.

Accordingly, between a preview start 90a and a storing start 91a, a time interval may be generated in buffering of at least one image frame.

When it is requested to stop capturing by a user, the processor 13 of the electronic device 100 may immediately perform a preview stop 90b, and may perform a storing stop 91b after storing all permanent images that correspond to preview images that have already been displayed.

For example, if a last preview image displayed on the preview screen at a time of requesting the storing stop is an image frame of a scene n, the storing may be stopped after storing up to a permanent image corresponding to the image frame of the scene n. In this case, a time consumed for buffering a specific frame may be generated, and the operation of maintaining the storing for the specific time may be performed as a background operation which is not recognizable by the user.

FIGS. 1-9 are provided as an example only. At least some of the operations discussed with respect to these figures can be performed concurrently, performed in different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

Moreover, the embodiments disclosed in this specification are suggested for the description and understanding of technical content but do not limit the range of the present disclosure. Accordingly, the range of the present disclosure should be interpreted as including all modifications or various other embodiments based on the technical idea of the present disclosure.

What is claimed is:

1. A method for use in an electronic device, comprising:
   capturing one or more image frames by using at least one image sensor of the electronic device;
   displaying, on a display, a first image that is generated by performing a first-type Digital Image Stabilization (DIS1) based on at least some of the image frames, the DIS1 is being associated with a first time delay; and storing, in a memory, a second image generated by performing a second-type Digital Image Stabilization (DIS2) based on at least some of the image frames, the DIS2 is being associated with a second time delay,
wherein the first time delay is smaller than the second time delay.

2. The method of claim 1, wherein:
the DIS1 is performed based on a first image frame and a second image frame that is captured before the first image frame, and
the DIS2 is performed based on the first image frame, the second image, and a third image frame that is captured after the first image frame.

3. The method of claim 1, wherein the one or more image frames are continuously captured by the image sensor, and are temporarily stored in a buffer in a consecutive order.

4. The method of claim 1, wherein at least one of the DIS1 and DIS2 is performed based on a measure of camera shake that is obtained by using a gyro sensor included in the electronic device.

5. The method of claim 4, wherein at least one of the DIS1 and DIS2 is performed in response to the measure of camera shake exceeding a threshold.

6. The method of claim 1, wherein:
the first image and the second image depict the same scene, and
the first image has a lower resolution than the second image.

7. The method of claim 1, wherein the displaying of the first image and the storing of the second image are performed within a predetermined time interval.

8. The method of claim 7, further comprising:
stopping the display of the first image in response to detecting that a predetermined condition is satisfied,
wherein the second image is stored in the memory after the display of the first image is stopped.

9. The method of claim 8, wherein the storing of the second image is performed as a background operation.

10. An electronic device comprising:
an image sensor;
a memory; and
at least one processor operatively coupled to the memory, configured to:
capture one or more image frames by using the image sensor;
display a first image that is generated by performing a first-type Digital Image Stabilization (DIS1) based on at least some of the image frames, the DIS1 is being associated with a first time delay; and
store, in the memory, a second image generated by performing a second-type Digital Image Stabilization (DIS2) based on at least some of the image frames, the DIS2 is being associated with a second time delay,
wherein the first time delay is smaller than the first time delay.

11. The electronic device of claim 10, wherein
the DIS1 is performed based on a first image frame and a second image frame that is captured before the first image frame, and
the DIS2 is performed based on the first image frame, the second image, and a third image frame that is captured after the first image frame.

12. The electronic device of claim 10, wherein the one or more image frames are continuously captured by the image sensor, and are temporarily stored in a buffer in a consecutive order.

13. The electronic device of claim 10, further comprising a gyro sensor, wherein at least one of the DIS1 and DIS2 is performed based on a measure of camera shake that is obtained by using the gyro sensor.

14. The electronic device of claim 13, wherein at least one of the DIS1 and DIS2 is performed in response to the measure of camera shake exceeding a threshold.

15. The electronic device of claim 10, wherein:
the first image and the second image depict the same scene, and
the first image has a lower resolution than the second image.

16. The electronic device of claim 10, wherein the display of the first image and the storing of the second image are performed within a predetermined time interval.

17. The electronic device of claim 16, wherein:
the at least one processor is further configured to stop the display of the first image in response to detecting that a predetermined condition is satisfied, and
the second image is stored in the memory after the display of the first image is stopped.

18. A non-transitory computer-readable medium storing one or more processor-executable instructions which when executed by at least one processor cause the at least one processor to perform a method comprising the steps of:
capturing one or more image frames;
displaying a first image that is generated by performing a first-type Digital Image Stabilization (DIS1) based on at least some of the image frames, the DIS1 is being associated with a first time delay; and
storing, in a memory, a second image generated by performing a second-type Digital Image Stabilization (DIS2) based on at least some of the image frames, the DIS2 is being associated with a second time delay,
wherein the first time delay is smaller than the second time delay.

* * * * *